Figure 2:
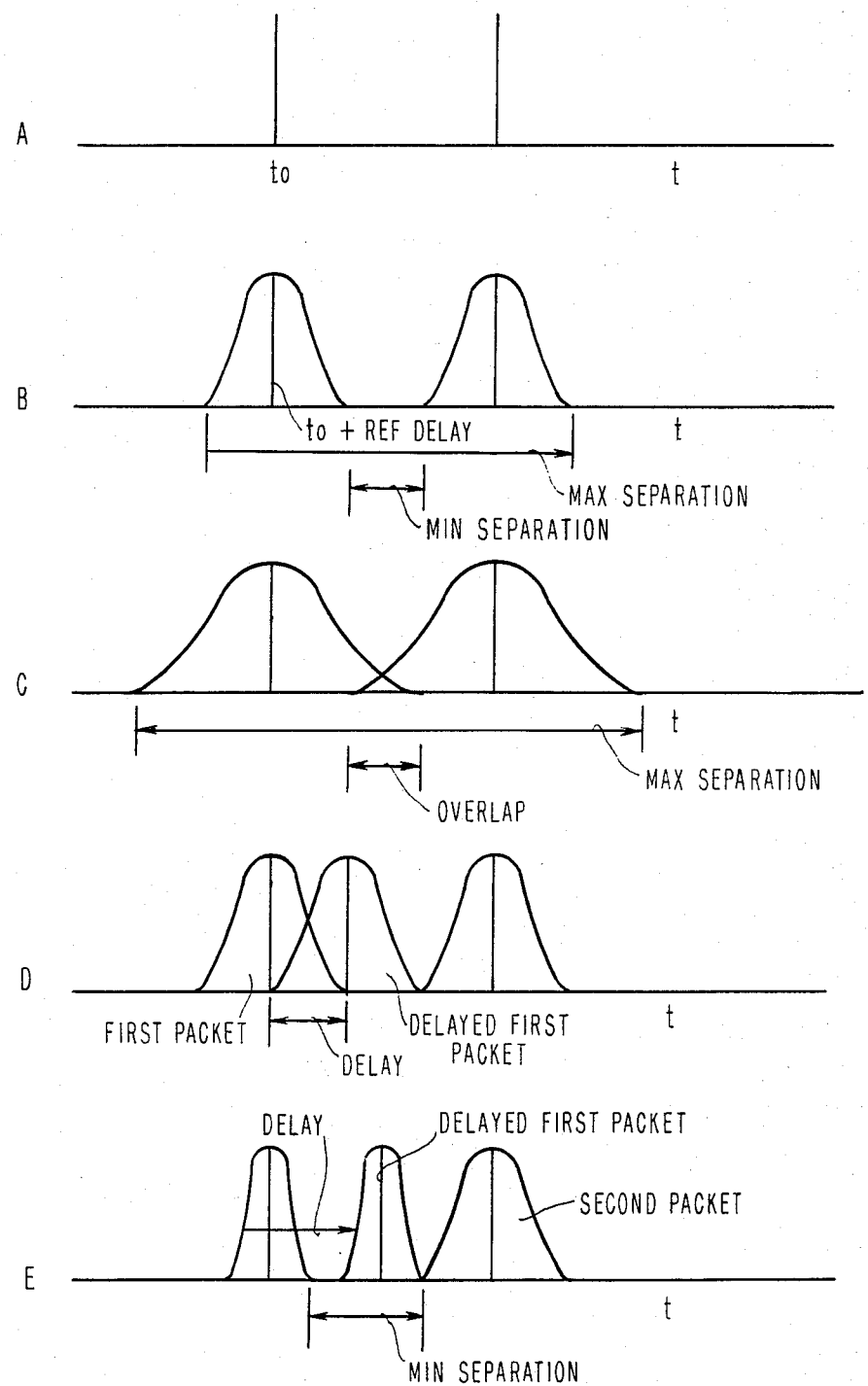

United States Patent [19]

Moore

[11] Patent Number: 4,538,259
[45] Date of Patent: Aug. 27, 1985

[54] SYSTEM FOR DIGITIZED VOICE AND DATA WITH MEANS TO COMPENSATE FOR VARIABLE PATH DELAYS

[75] Inventor: Brian B. Moore, Poughkeepsie, N.Y.

[73] Assignee: International Business Machines Corporation, Armonk, N.Y.

[21] Appl. No.: 511,059

[22] Filed: Jul. 5, 1983

[51] Int. Cl.³ .................... H04J 3/02; H04Q 11/04; H04J 6/00
[52] U.S. Cl. .................................. 370/60; 370/85; 370/94
[58] Field of Search .................. 370/60, 94, 58, 85

[56] References Cited

U.S. PATENT DOCUMENTS

| | | | |
|---|---|---|---|
| 4,074,232 | 2/1978 | Otomo et al. | 370/94 |
| 4,237,553 | 12/1980 | Larsen | 370/94 |
| 4,292,623 | 9/1981 | Eswaran et al. | 370/94 |
| 4,312,065 | 1/1982 | Ulug | 370/94 |
| 4,399,531 | 8/1983 | Grande et al. | 370/60 |
| 4,453,247 | 6/1984 | Suzuki et al. | 370/60 |
| 4,466,096 | 8/1984 | Heins et al. | 370/85 |

OTHER PUBLICATIONS

IEEE Transactions on Communications, vol. COM-28, No. 2; Feb. 1980; pp. 217-227; Barberis et al.; "Analysis and Optimal Design of a Packet-Voice Receiver".

Patents Abstracts of Japan, vol. 5, No. 181, Nov. 20, 1981; p. 157 E 83, Hitachi et al.; 01-09-1981.

International Conference on Communications; Jun. 14-18, 1981; vol. 2, pp. 41.6.1-41.6.5; Suzuki et al.; "An Adaptive Control on Length of Jitter Absorbing Buffer in Packet Speech System".

IEEE Proceedings, vol. 130, part G, No. 4; Aug. 1983; pp. 105-113; Clarke et al.; "Experiments with Packet Switching of Voice Traffic".

Primary Examiner—Douglas W. Olms
Assistant Examiner—Frank M. Scutch, III
Attorney, Agent, or Firm—W. S. Robertson

[57] ABSTRACT

In a communications system in which voice is transmitted as packets of digitized samples, a receiving station delays the output of the first packet in a way that compensates for wide variations in the intervals at which successive packets are received. According to one feature of this system, a first packet is transmitted at a higher priority so that a greater delay can be used without encounter problems that arise from the uncertainty in the delay in transmitting this packet. In another feature of this system, the arrival time of the first few packets of a conversation are detected and the delay is readjusted in case the first packet has been unusually delayed.

5 Claims, 3 Drawing Figures

FIG. 1
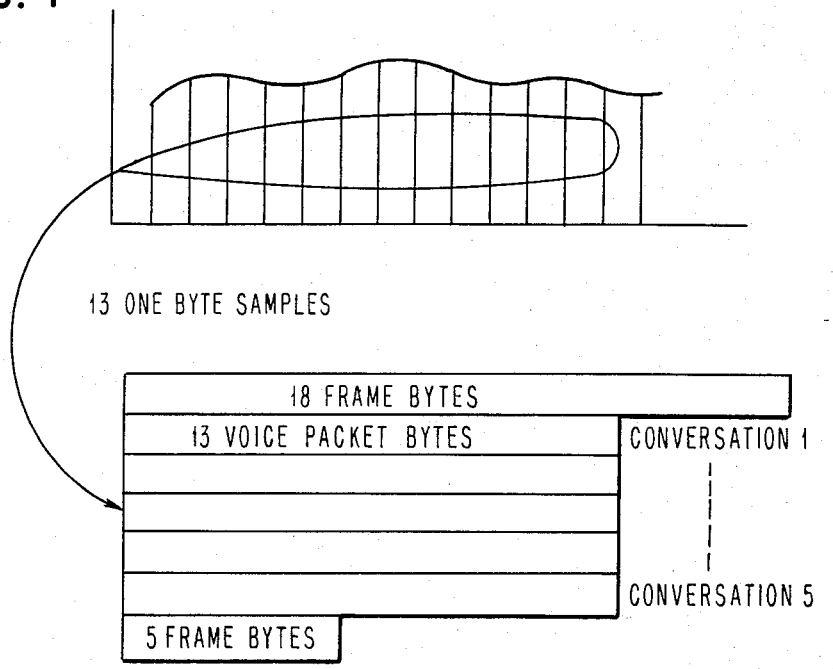
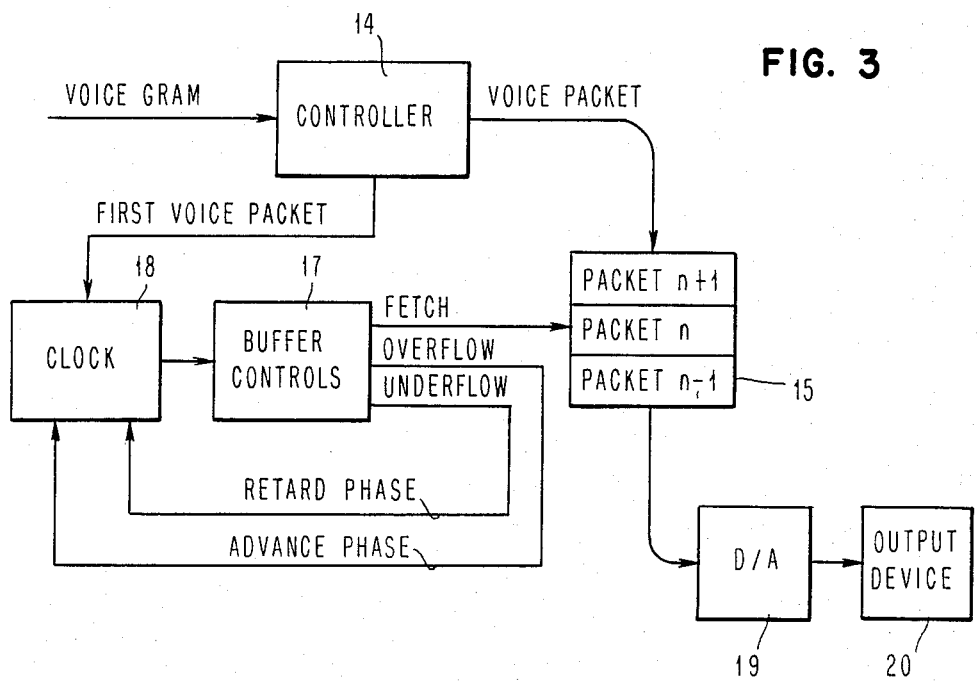
FIG. 3

SYSTEM FOR DIGITIZED VOICE AND DATA WITH MEANS TO COMPENSATE FOR VARIABLE PATH DELAYS

FIELD OF THE INVENTION

This invention relates to a communications system in which both data and voice are represented in a digitized form.

Introduction

This invention relates to a digital communications system that carries data and also carries digitized voice. In a large network, a terminal user would communicate with a data processor and with data processing apparatus at other terminals in a way that is conventional for digital systems that do not now also carry voice. A terminal user would also have a telephone set and would communicate with other users by voice in the general way in which people now use telephones. The voice signals would be digitized, but this would not be apparent to the user. From the standpoint of the communications system, digital voice differs from digitized data because the allowable time delays are quite different. Even a very slight delay is undesirable for processing the voice transmission, whereas a longer processing time is acceptable for most data transmissions. Thus, as a simplification, the system that will be described can be thought of as operating with a heavy voice traffic and with little or no data traffic.

To transmit voice on a digital system, the analog voice signal is sampled and digitized at successive time invervals that are called the voice sample period. A header is transmitted with the sample to identify both the receiver and the sender and to carry other control information. Since the voice sample period is short in relation to the acceptable delay, several successive voice samples from a speaker are combined and transmitted with a common header. Such a collection of samples is called a "packet". Since the sample rate, is low in relation to the data rate samples from a number of terminals can be transmitted on the system in a time multiplex operation. Packets from different users can be combined with a common header. A group of packets will be called a message or a voice gram.

In a complex network, several user terminals are arranged in a cluster with a common communications controller. A message can be transmitted directly from a sender at one terminal to a receiver at another terminal in the same cluster, or a message may be routed through one or more intermediate stations. An intermediate terminal might inspect the message header and then forward the message to the receiving terminal or to another intermediate station. If an intermediate station must be used, there may be a choice of several ways to route the message. The next intermediate station to receive a message might be chosen because it is on the most direct route or the least busy route to the destination terminal. Thus, even when the transmissions are kept within the limits of acceptable delay, the delays may differ over a wide range, and at times a later packet may be received before an earlier packet.

In a non-voice digital system, delays of this type are taken care of by buffering. As data is received it is entered into a data buffer memory. In a simple example, there is a sufficient delay between the time an entry is received and the time it is removed from the buffer so that there is always at least one entry in the buffer and the buffer can be unloaded at a uniform rate regardless of the variations in the times of entering the data. If the delay is sufficient to keep several entries in the buffer at all times, the packets can be reordered if a later packet arrives before an earlier packet. These techniques are undesirable in a voice system because they lengthen the delay in transmitting a message between the speaker and the listener.

In one suggestion of the prior art for handling variations in delays in transmission, the first packet of a conversation is delayed slightly at the receiving station. The following packets on the average are delayed by this same amount in the normal operation of handling the packets at uniform intervals of time. The effect is analogous to buffering the packets for the same time interval: a packet that arrives early can be held in the processing circuits until it is needed. A packet that arrives late with respect to the time it was transmitted will have arrived only normally late with respect to the delayed processing time of the first packet of the transmission.

SUMMARY OF THE INVENTION

An object of this invention is to provide a new and improved system that uses a delay in the first packet. A more specific object can be understood by first considering the prior art system in more detail. Consider a normal distribution curve that might represent the delays in transmitting packets between a sender and a receiver. The midpoint of the curve represents an average delay and the left and right ends of the curve represent respectively the smallest and the largest delays that the system is intended to handle. If the first packet arrives with an average delay, then delaying this packet by the time between the average delay point and the maximum delay point will produce the desired result: a later packet that is delayed by the maximum amount will still arrive in time to be processed normally. (That is, the system is able to tolerate this much delay beyond the normal buffering that the circuits apply to each packet). A packet that arrives sufficiently beyond the maximum delay will be lost because its time for processing has already been passed or because later packets have already been processed. On the other hand, a packet that arrives earlier than the usual range will be lost because the circuits have only a limited capability to hold packets before they are processed.

In this prior art there is a problem if the first packet arrives with either a minimum delay or a maximum delay. According to one feature of this invention, the first packet of a message is sent at a high priority and the subsequent packets of the message are sent at a lower priority. This feature gives the first packet a delay time that is well defined with respect to the average time positions of the subsequent packets and it permits the delay of the first packet to be made greater without causing the problems that have been described in the preceding paragraph.

According to another feature of this invention, means is provided at the receiving station for sampling the times of the first few packets after the first packet of a message. The delay time for the first packet is then adjusted to provide a better value. Ordinarily this operation will be completed within a time before speech actually begins and it will be imperceptable to the users of the system.

The invention includes several related features that will be summarized after the following description of the preferred embodiment of the invention.

THE DRAWING

FIG. 1 is a diagram that illustrates a digitized voice message.

FIG. 2, line A is a timing diagram for voice packets that are transmitted at regular intervals from a sending station.

FIG. 2, lines B through G show the arrival times of these packets at a receiving station under varying conditions of delay and they also illustrate operations of this invention that change the relative arrival times of the samples.

FIG. 3 shows a conventional receiving station with a modification of this invention.

Introduction—FIG. 1

FIG. 1 illustrates terminology that will be used in this specification. A voice waveform 12 is shown along the time axis of a graph. At intervals of for example 125 microseconds (8000 Hz) the amplitude of the waveform is sampled, as vertical lines represent. These sample values are digitized, for example in an eight bit (one byte) code. These digital values are entered into a data buffer continuously and they are removed from the buffer in a data unit that is called a voice packet that has a suitable number of samples, preferably thirteen. Thus, a voice packet in this example represents 1.625 milliseconds of the voice signal. Several (preferably five) voice packets from different senders are combined with framing information into a data unit called a voice gram. The framing information identifies the sender and the receiver for each voice packet. Since a conversation between a particular sender and receiver will ordinarily run over a large number of voice packet times, the sender and the receiver can be identified in the framing information by a unique conversation code and a voice packet in the representation of FIG. 1 can be referred to as part of a particular conversation without regard to the particular sender and receiver.

In FIG. 1 the voice gram is represented by seven lines, one for the beginning framing information, five lines for the five conversations, and one line for ending framing information. Preferably the first line has eighteen bytes and the last line has five bytes. Thus in this example there are twenty-three framing bytes and sixty-five sample bytes in a voice gram. These bytes are transmitted sequentially without regard to the separation of lines that has been used in FIG. 1 to illustrate different parts of the voice gram.

Ordinarily, it is desirable to transmit a relatively small number of framing bytes. The minimum number of framing bytes is substantially fixed by the requirements of the communications system. The maximum number of sample bytes is in part limited by problems that this invention is intended to minimize.

The format of FIG. 1 is readily adaptable to the protocols of various digital communications systems. The voice gram is assembled by a communications controller and is sent to a receiving station or to an intermediate station. An intermediate station may read the framing information and direct the message to the destination station or to a next intermediate station. At the destination station, the controller sends each voice packet to the appropriate receiving station according to the information in the framing bytes. At the receiving station the sample bytes are loaded into a buffer and bytes are removed in sequence and are reformed into a voice signal by a digital to analog converter. Some aspects of this conventional operation will be described later in the description of this invention.

In a complex network with many stations, an intermediate station may assign a different routing to different voice grams of the same conversation so that the delay between the sending station and the receiving station may be different for different parts of the same conversation. Delays can also be caused by other conditions of the communications system that occur randomly and thereby cause the packets to be received at varying intervals.

The Delay Problem—FIG. 2, lines A, B and C

FIG. 2, line A shows a horizontal time axis with vertical markers that represent a succession of times when digitized voice packets are transmitted from a sending station. These lines are equally spaced but from a more general standpoint the spacing represents an average or reference time interval. The vertical lines represent the beginning of a transmission that extends over a fraction of the interval between sending times, and the length of the transmission is not shown in the drawing. Line B shows vertical lines with the same time spacing. These lines are directly under the corresponding lines of line B and they represent an idealized situation in which each packet is received at the receiving station at intervals that are identical to the sending interval. Between sending a mark in FIG. 2, line A and the receiving mark for the corresponding packet in FIG. 2, line B, there is some reference value of time delay that is substantially fixed throughout the transmission, as legends show in the drawing. This time delay is small enough that it is not objectionable to people using the system, but otherwise the delay is arbitrary and it is represented in the drawing only by the vertical spacing between lines in FIG. 2.

FIG. 2, line B, also shows the familiar bell shaped standard distribution curve that represents variations in the delay that a packet experiences between the transmitting station and the sending station. The vertical line still represents some fixed average or reference value of delay. The left hand edge of the distribution curve represents a minimum delay and the right hand edge represents a maximum delay. (the left hand part of the curve of course extends into the reference delay between line A and line B.) In an actual system, the distribution of delays can have some different form. For example, it might be heavily skewed toward a minimum delay equal to the reference delay. However, in any case line B illustrates that a large proportion of the transmissions arrive with some delay that is near a reference value and a smaller proportion of transmissions earlier or later than the reference delay. Otherwise, the distribution curve is significant only for its width along the time axis and the distribution of transmissions within this span is not specifically relevant to this invention. In the example of FIG. 2, line B, there is a gap between the latest arrival of one transmission (the right edge of the distribution curve) and the earliest arrival of the next transmission (the left edge of the distribution curve) so that each packet arrives in its sequence regardless of the variations in the delay.

FIG. 2, line C, is similar to FIG. 2, line B, except that the distribution curves have been widened so that they overlap slightly. The area of overlap represents the situation in which a first packet arrives late and a second packet arrives with a small delay and is received out of sequence before the first packet. Other distributions with various degrees of overlap or underlap will be understood from lines B and D.

Some aspects of this invention are particularly directed to the overlap problem illustrated in FIG. 1C but other aspects of the invention are useful in either situation. For most situations, this will be apparent from the description without specific comment.

In the normal operation of receiving stations, one voice packet is being received and stored in a buffer while a preceding packet is being read from the buffer and converted to an analog signal, and the receiving station buffer always has at least one byte that is to be sent to the digital to analog converter. The object of this invention is to prevent this buffer from being empty because there has been a delay in receiving a packet and conversely to prevent it from overflowing because a packet has arrived too early. In a particular system it may be possible to buffer several voice packets so that it would almost never occur that a delay would cause a problem between adjacent packets. However, these same problems can occur with buffered packets and these problems are aptly illustrated by the examples in which there is negligible buffering.

In FIG. 2, lines B and C, arrowed lines represent a maximum time separation between the the actual arrival times of two packets. For some value of this separation the message at the receiving station is distorted. As an example, there may simply be a noticeable break in the arrival times of the packets. Similarly, at some minimum separation the time for processing one packet may extend into the time when the next packet should be presented to the listener.

Delaying the First Packet—FIG. 2, Line D

FIG. 2, line D, shows the prior art technique that is used in this system for delaying the first packet of a message. The effect is the same as if each subsequent packet arrived earlier by the amount that the first packet is delayed. A problem with this transmission technique can now be explained. The actual delay in the arrival time of the first packet is unknown. It may arrive with some minimum or maximum delay that is represented by the distribution curve. Consequently, the effective delay of the first packet is the added delay plus the unknown difference between the actual arrival time and the reference time. If the pulse actually arrives early in the distribution, only a minimum delay is achieved. Since the packet may in fact arrive late, the added delay must be limited so that it does not overlap the distribution of arrival times for the next packet. Section 2 of the Specification describes one solution to this problem and Section 3 describes a second solution to this problem. Note that line D has the same distribution curves as line B, but the explanation applies generally.

The Method of FIG. 2, Line E

As FIG. 2, line E shows, the first packet of a message is handled in a way to more closely define its arrival time at the receiving station. This packet has a narrowed distribution of arrival times. The other packets have the distribution of arrival times that has been described earlier or a wider distribution. As line E shows, the time interval between the latest arrival of the first packet and the earliest arrival of the second packet has been increased because the first packet is not allowed to arrive as late with respect to the reference time as in the systems illustrated by Figs. 1A through 1D. Therefore, the first packet can be given a greater delay than before so that larger delays by the other packets can be handled without loss of signal or the system can use the delay illustrated in FIG. 2, lines C and D and benefit from the reduced likelihood that an early arrival pulse will cause a problem.

The operation illustrated in line E is achieved by operating conventional transmission apparatus in a relatively higher priority for a first packet and in relatively lower priorities for subsequent packets. If all packets were transmitted at a suitable priority, the system would operate in the idealized situation represented by FIG. 2, line B, where each packet arrives within a time distribution that permits the voice signal to be reconstructed accurately.

As an introduction to this section, consider the system of FIG. 1 line B in which there is a variation in the delay of the messages but the delay is limited in relation to the spacing between voice packets so that each voice packet arrives at the receiving station in its original sequence and separate from the preceding and following packets. Suppose that the maximum and minimun separations between adjacent packets is in fact acceptable for voice transmission. This condition can be thought of as resulting from giving each voice packet a very high priority so that it arrives in a minimum time and thus with very little variation in the time delay. However, this hypothetical situation is undesirable for most conversations in a complex network because other conversations receive lower priority and thereby experience a greater variation in their delays.

According to this invention, the first voice packet of a conversation is given a high priority. FIG. 2 line E when compared with FIGS. 2B or 2C lines B or C shows the advantageous effect of this operation. The distribution curve for delays in the first packet is narrower than the distribution curves for the other packets. The distribution curves for these other packets are only slightly wider than in the other lines (and this difference is not represented in the drawing) because only a relatively small number of voice grams contain a voice packet that is the first packet of a conversation.

It can be seen that the minimum separation between the arrival of the first voice packet and the arrival of the second voice packet in FIG. 2 line E is less than the minimum delay in line B or C, which represent systems without this priority assignment. Consequently, the delay that is introduced in processing the first packet can be made larger and correspondingly greater delays can be handled in subsequent packets.

The first voice packet of a conversation is recognized by conventional apparatus and/or methods that are otherwise used to accept a new conversation in the communications system. Communications systems conventionally have several levels of priority for different messages. Conventionally the priority of a message may be implicit from some independent feature of the message (for example that a data message has a lower priority than a voice message) or the framing information may have priority information that is read by each intermediate station and used in transmitting a voice gram to the next station.

The distribution of delays for a high priority message is narrower for a high priority message than for a lower priority message for a number of reasons. For example, a message may be put into a queue at an intermediate station and handled after some delay that depends on the number of messages already in the queue.

To summarize the description so far of line E of FIG. 2, the higher priority for the first packet narrows the distribution of the first packet and thereby at the receiving station allows it to be moved ahead (delayed) closer toward the following samples. It is also an important advantage that the uncertainty of the location of this pulse is reduced. This effect can be understood in relation to FIG. 2, line F, which will be described next.

Notice that in the preceding description of FIG. 2, line E, the delay in the first packet was based on a reference line that in fact is not directly known to the system. All that is known when the delay is introduced into the first packet is the actual arrival time of the packet. Thus the fixed delay that is shown in FIG. 2, line E, can begin at any point within the distribution of arrival times for the first sample. If the first sample arrives at a maximum early point in its distribution time, then the actual delay will be less than the delay represented in line E. Conversely, if the first sample arrives with its maximum delay, it will be delayed further. In other words, the fixed delay for the first sample is added to an unknown delay. Thus, the system of line E permits a significant delay in the first sample because this unknown delay is reduced, preferably to the point where the analysis of FIG. 2, line E accurately describes the system. A system to compensate for any remaining significant variation will be described next.

The System of FIG. 3

FIG. 3 shows some of the components of a conventional receiving station and additional components that provide an improved operation. The data comes into the station on a line 12 to a controller 14 that handles the header information in the voice gram and sends the voice packet to the appropriate receiving station where the packet is loaded into a buffer 15. The buffer has a limited capacity and it holds some suitable number of samples. As an example that illustrates the general case, suppose that the buffer holds a packet n−1 that is being converted to audio, the next packet n, and part of a packet n+1 that is being loaded into the buffer. Buffer controls 17 send a fetch command to unload the buffer at a particular rate that is controlled by a clock 18. At each clock time, a sample byte is transferred to an analog to digital converter 19 that sends a voice signal to a suitable output device 20 such as a speaker.

Components provide a fixed delay in the first sample byte of a conversation as is conventional. In addition, means is provided for providing a delay in the next few packets in response to a signal that signifies that the first packet was in fact received significantly earlier or later than the reference position. If the voice packets were received in the discrete sequence that is represented in FIG. 2, line B, the input buffer contains a full packet and parts of the preceding and following packets as already described. If the packets arrive early or late with respect to the reference positions, then this orderly operation in the buffer is lost, and this effect is used to signal that the initial delay in the first packet was not appropriate.

Suppose that the first packet has arrived at the latest point in its distribution of arrival times so that the fixed delay initially added is combined with a maximum variable delay. Subsequent packets then appear to arrive earlier and the buffer may overflow. The system of FIG. 3 monitors the buffer overflow and if this occurs, the phase of the clock is advanced so that the subsequent packets are unloaded from the buffer earlier than their reference positions. Notice that this does not require the packets to be in the buffer any earlier than before. Conversely, if the first pulse has arrived at the earliest point in its distribution curve, the fixed delay has a minimum value. In some situations, this may permit the buffer to become empty—the condition that the fixed delay of the prior art is intended to prevent.

The apparatus of FIG. 3 has conventional means to detect the underflow of the buffer or of a particular stage of the buffer during the first few voice packet times. If the buffer becomes empty the phase of the buffer clock is retarded so that the delay that otherwise would have been given to the first packet is now given to one of the first few packets and the subsequent packets arrive relatively early by an amount that is appropriate to the system.

Other Embodiments

From this description of preferred embodiments of the invention, those skilled in the art will recognize variations in implementation within the spirit of the invention and the scope of the claims.

Having thus described my invention, what I claim as new, and desire to secure by Letters Patent is:

1. In a communication system of the type in which voice signals for a sending station are formed into a packet and in which Packets from several sending stations are combined into a message and are transmitted to intended receiving stations, the system having alternate pathways through intermediate stations such that messages containing first or subsequent packets in a conversation may arrive at an intended receiving station at varying times in relation of the time when the voice signal originated, the intermediate stations having means for handling a message according to a priority carried by the message, and in which the receiving station has means for delaying the output of the first packet of a conversation to compensate for variations in the delays of said subsequent packets, the improvement comprising, means at the sending station for designating a message containing a first packet of a conversation to have a higher priority and for designating messages not containing a first packet of a conversation to have a lower priority, whereby the range of delays for the first packet of a conversation transmitted through said pathways is less than the range of delays for packets transmitted at a lower priority and thereby a reduction is made in the range of the minimum time interval between the latest arrival of said first packet of a conversation and the earliest arrival of a message containing the next packet of the same conversation, and means in a receiving station for delaying the first packet by an amount that is related to the more closely defined range of time intervals between said first packet and said next packet and is appropriate to a wide range of delays in the subsequent messages.

2. In the system defined in claim 1, the improvement comprising, means in a receiving station for detecting the time occurrence of a few packets following the first packet, and means for giving an additional time delay to one of the first few packets to correspond to delays encountered by said following few packets, whereby the system is adapted to a wide range in the distribution of delays in subsequent packets.

3. The system of claim 2 wherein the means for detecting the relative arrival times of the next few packets after the first sample comprises, means for detecting the times of arrival of a number of packets that is typically silence at the beginning of a voice conversation, whereby the system adjusts the delay before the typical voice signal begins.

4. The system of claim 2 wherein the system comprises means for buffering a small number of samples, and wherein the means for detecting the times of arrival of the next few samples comprises, means for detecting an overflow of the buffering means.

5. The system of claim 4 wherein the means for detecting the times of arrives comprises means for detecting an underflow of the buffering means.

* * * * *